United States Patent
White

(10) Patent No.: US 10,435,115 B1
(45) Date of Patent: Oct. 8, 2019

(54) MARITIME BULKHEAD PROTECTOR

(71) Applicant: Robert P. White, Hertford, NC (US)

(72) Inventor: Robert P. White, Hertford, NC (US)

(*) Notice: Subject to any disclaimer, the term of this patent is extended or adjusted under 35 U.S.C. 154(b) by 0 days.

(21) Appl. No.: 16/263,111

(22) Filed: Jan. 31, 2019

(51) Int. Cl.
| | |
|---|---|
| *B63B 3/56* | (2006.01) |
| *E04G 11/00* | (2006.01) |
| *E04G 11/08* | (2006.01) |
| *E04G 17/00* | (2006.01) |
| *B63B 3/10* | (2006.01) |
| *B63B 3/42* | (2006.01) |
| *F16M 13/02* | (2006.01) |
| *B63B 59/00* | (2006.01) |

(52) U.S. Cl.
CPC ............... *B63B 3/56* (2013.01); *E04G 11/00* (2013.01); *E04G 11/08* (2013.01); *E04G 17/00* (2013.01); *B63B 3/10* (2013.01); *B63B 3/42* (2013.01); *B63B 59/00* (2013.01); *F16M 13/02* (2013.01)

(58) Field of Classification Search
CPC ......... E04G 11/00; E04G 11/08; E04G 21/00; E04G 21/02; E04G 21/32; E04G 17/00; E04G 17/001; E04G 17/004; E04G 17/02; E04G 17/04; E04G 17/14; E04G 13/00

USPC ................. 114/116; 249/3, 5, 6, 34
See application file for complete search history.

(56) References Cited

U.S. PATENT DOCUMENTS

| | | | | |
|---|---|---|---|---|
| 6,834,471 B2* | 12/2004 | Takagi | ................... | E04G 13/00 249/3 |
| 7,290,749 B1* | 11/2007 | Jessop | ................... | E04G 13/00 249/34 |

* cited by examiner

*Primary Examiner* — Lars A Olson
(74) *Attorney, Agent, or Firm* — Michael L. Greenberg, Esq.; Greenberg & Lieberman, LLC

(57) ABSTRACT

A bulkhead protector apparatus is described. The protector is configured to be mounted within a cavity of the sheetpile of a bulkhead in order to prevent waves, wake, and debris from reaching the top portion of the bulkhead, minimizing damage and prolonging the life of the bulkhead. An angled waterguard portion is disposed within the cavity, and is configured to deflect water down and away from the top of the bulkhead. The waterguard portion is mounted to a whaler of the bulkhead via a planar mount portion which is secured to the underside of the whaler of the bulkhead via stainless steel lag bolts.

5 Claims, 3 Drawing Sheets

MARITIME BULKHEAD PROTECTOR

FIELD OF THE PRESENT INVENTION

The present invention relates to the field of waterline border reinforcements, and more specifically relates to a new form of bulkhead protector configured to protect the bulkhead, and therefore the land and property behind the bulkhead, from premature wear due to waves, tidal pressures, currents, wake, and the like.

BACKGROUND OF THE PRESENT INVENTION

A variety of bulkhead products are presently available on the market which are configured to securely protect a waterline of a property against erosion from tides, waves, currents, and wake, as well as to prevent erosion of the land itself into the water from rain, wind, and other weather effects. Most of the bulkhead products provide a vertical barrier along the waterline, which conventionally extends vertically from below the waterline to the horizontal plane of the land. The vertical barrier begins beneath the soil underwater, and therefore employs vertical piles which are installed to an industry standard depth below the soil and water. The height of the bulkhead varies regionally, but is always capable of handling typical rises of tidal waters.

While bulkheads such as these are adept at protecting the land, over periods of time, conventional bulkheads require repair and replacement, as little prevents the force of water from affecting the bulkheads themselves. Extreme tides, such as those before or after intense storm are known to exasperate this damage, as the top of most bulkheads are composed of wood or similarly buoyant material. As the water rises, the top horizontal portion of the bulkhead may become loosened. Additionally, strong storms produce large waves which batter the bulkhead further, causing waves to crash into the bulkhead, splashing water upwards to the top horizontal cover portion (cap) of the bulkhead, further weakening its disposition over time.

If there were a way to deflect the vertical movement of water from waves and wake from striking the top horizontal portion of bulkheads, the position, durability, and ultimate disposition of the bulkheads would be optimized, leading to less frequent repairs, and more seldom required replacements. The market is presently lacking in any product configured to protect the bulkhead itself from disruptive water.

Thus, there is a need for a bulkhead protector apparatus configured to deflect water away from the top horizontal portion of the bulkhead which helps to extend the life of the bulkhead and prevent premature wear. Such an apparatus is preferably configured to rest below the top horizontal portion of the bulkhead with a waterguard. A waterguard such as this is preferably disposed at a 45-degree angle to deflect water away from the top and sides of the bulkhead, increasing durability of the bulkhead.

SUMMARY OF THE PRESENT INVENTION

The present invention is a bulkhead protector apparatus configured for use with conventional residential and/or industrial bulkhead installations. An angled waterguard portion is configured to slide within a cavity of the sheetpile of the bulkhead. The sides of the waterguard portion are also angled in order to suit the angle and depth of the cavity of the sheetpile. A horizontal planar portion is equipped with mounting holes, which are configured to facilitate mounting of the present invention to a whaler of the bulkhead to ensure the present invention remains in position when struck by waves and wake.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

Figure 1:
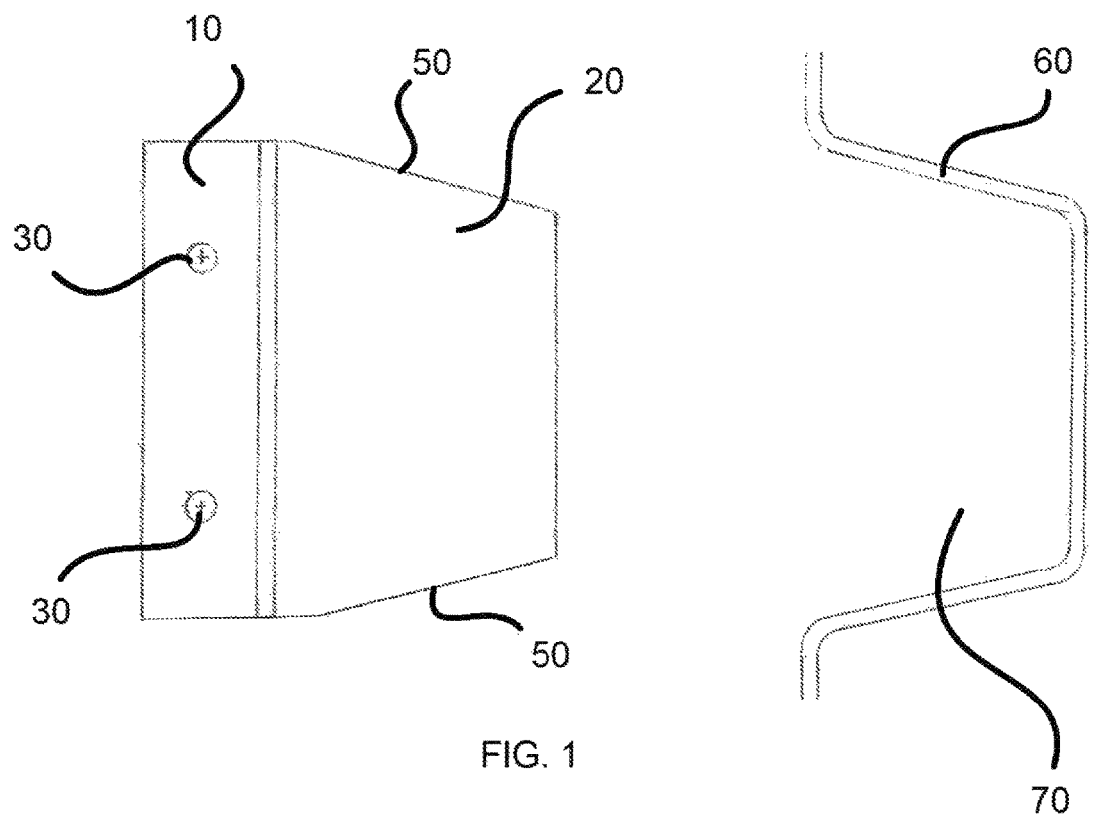
FIG. 1 depicts a view of the preferred embodiment of the present invention as seen from the side.
Figure 2:
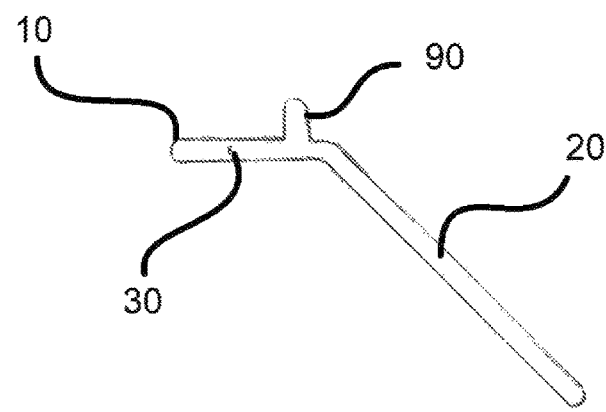
FIG. 2 exhibits a view of the present invention as seen from the top.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a bulkhead protector apparatus and system configured for use with a conventional bulkhead. The apparatus is equipped with a planar mount portion (10) which is horizontal when installed, and a waterguard portion (20). The waterguard portion (20) of the present invention is preferably angled at a 45-degree angle to facilitate the protection of the bulkhead from the movement of water. The waterguard portion (20) is equipped with sides (50) which are also angled order to match the angle and depth of sheetpile (60) of the bulkhead to which the present invention is installed. The present invention is preferably a unitary piece of material such as PVC or metal. In the preferred embodiment of the present invention, the planar mount portion (10) and waterguard portion (20) are configured to remain static in position. The waterguard portion (20) is configured to extend all the way to the inner portion of a cavity (70) of the sheetpile (60) of the bulkhead vertical portion.

Figure 3:
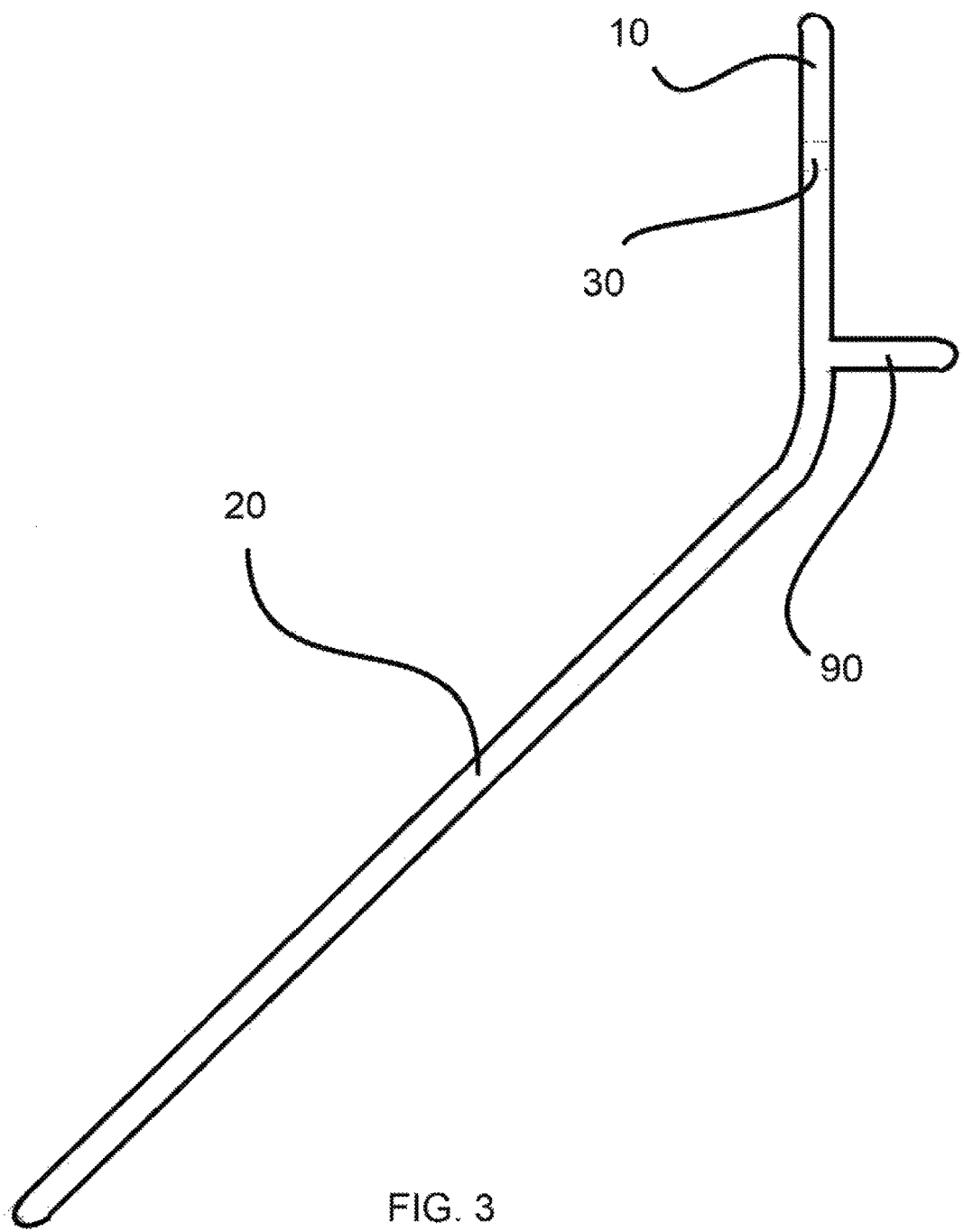
FIG. 3 depicts a view of the present invention in isolation as seen from the side profile.
Figure 4:
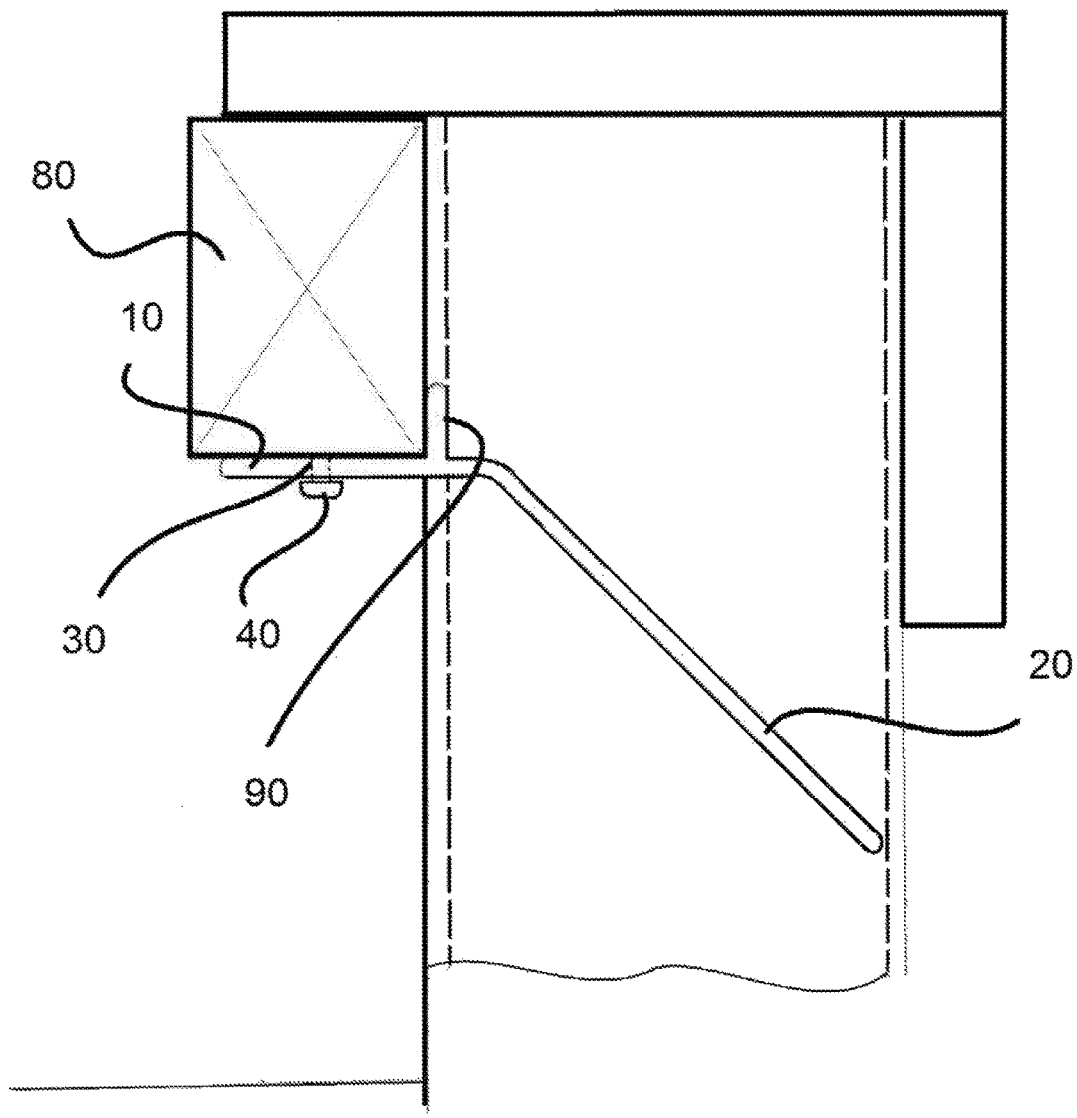
FIG. 4 shows the preferred embodiment of the present invention as installed on a conventional bulkhead.

The planar mount portion (10) is equipped with mounting holes (30), which are configured to facilitate the mounting of the present invention to a bottom of the horizontal top portion, known as the whaler (80) of the bulkhead itself as seen in FIG. 3. Stainless steel lag bolts (40) are preferably employed to mount the present invention to the bottom of the whaler (80) via the mounting holes (30). In some embodiments of the present invention, a vertical reinforcement portion (90) extends from a top of the planar mount portion (10), and is configured to rest against a vertical inner portion of the whaler (80), helping to ensure that the waterguard portion (20) does not pivot, break, or bend when struck by a strong wave. However, some embodiments of the present invention are not equipped with the vertical reinforcement portion (90). In embodiments of the present invention having the vertical reinforcement portion (90), the apparatus is preferably made via extrusion. However, in embodiments of the present invention lacking the vertical reinforcement portion (90), the present invention is preferably made via heat forming (thermoformed).

It is envisioned that the primary components of the present invention, including the waterguard portion (20), planar mount portion (10), and vertical reinforcement portion (90) are preferably composed of type 1 PVC, same as the sheetpile (60). In alternate embodiments of the present invention, or for installations in which the sheetpile (60) is composed of a different material, it is envisioned that other similar materials may be employed so long as they are durable, corrosion resistant, and rust resistant.

Similarly, it should be understood that, in a conventional installation of the present invention to a bulkhead, numerous iterations of the present invention are required, as each cavity (70) of the bulkhead requires a separate iteration of the present invention. The segmentation of the distribution of the present invention is an ideal feature, as some installations of bulkheads do not maintain consistent sizing of each cavity (70) across the entirety of the installation. As such, the dimensions of the waterguard portion (20), including the angle of the sides (50) may be different with each installation to accommodate curvature of the bulkhead, or to accommodate variations in spacing of the cavity (70) per the manufacturer's design of the bulkhead. Therefore, it should be understood that the overall dimensions and angles exhibited by the apparatus of the present invention may vary depending on the design of the bulkhead to which the present invention is installed.

Ideally, the present invention is preferably installed during the initial installation of the bulkhead itself. However, it should be noted that the present invention may be installed at any time during the lifespan of the bulkhead in order to add durability to the bulkhead. Additionally, it should be noted that the present invention is configured to be easily installed by an amateur, and need not require extensive training or equipment for proper installation.

Components of the present invention are preferably fashioned via heat form. The apparatus of the present invention is manufactured in accordance with the general dimensions of specific brands and designs of bulkhead in order to ensure a correct fit. As such, multiple sizes are made in order to adjust for the shape of the bulkhead to which the present invention is to be installed. If the waterguard portion (20) requires minor adjustment when in the field, it is envisioned that the installer or owner will shave the edge of the waterguard portion (20) with a saw or sander to customize the fit accordingly. These minor modifications may be performed easily at the installation site.

However, it is envisioned that other methods of manufacturing may be employed to achieve the formation of the apparatus of the present invention. For example, in alternate embodiments of the present invention, extrusion or co-extrusion method conventionally used for the crafting of various types of tooling and forming could be employed to fashion an iteration of the present invention. This is the same method by which sheet vinyl bulkhead sheetpile is formed. Only when manufactured via extrusion, it is envisioned that these pieces are to be cut-to-fit in the field from long pieces of formed PVC to be installed behind and underneath the top whaler (80) of the bulkhead via the stainless steel lag bolts (40). Alternate iterations of the present invention made via extrusion may also be sanded if minor modifications are needed.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:
1. A bulkhead protector apparatus comprising:
   a waterguard, said waterguard equipped with a first angled side and a second angled side;
   wherein said first angled side is equal in length to said second angled side;
   wherein said first angled side is angled toward said second angled side;
   wherein said second angled side is angled toward said first angled side;
   a planar mount portion, said waterguard extending from said planar mount portion at a 45-degree angle;
   wherein said planar mount portion has an area smaller than an area of said waterguard;
   mounting holes, said mounting holes disposed within said planar mount portion; and
   lag bolts, said lag bolts configured to extend through said mounting holes into a whaler of the bulkhead.
2. The apparatus of claim 1, wherein said lag bolts are composed of stainless steel.
3. The apparatus of claim 1, wherein said planar mount portion and said waterguard portion are a unitary piece of molded type 1 PVC.
4. The apparatus of claim 1, wherein the length of said first angled side and said second angled side is determined by the depth of a cavity of sheetpile of the bulkhead into which the waterguard is placed.
5. The apparatus of claim 3, further comprising:
   a vertical reinforcement portion, said vertical reinforcement portion extending vertically from a junction of said waterguard and said planar mount portion.

* * * * *